United States Patent [19]
Katori et al.

[11] Patent Number: 6,028,957
[45] Date of Patent: Feb. 22, 2000

[54] IMAGE FORMING APPARATUS HAVING A NOISE REMOVING UNIT

[75] Inventors: Kentaro Katori, Toyokawa; Yoshinobu Hada, Aichi-Ken; Masahiro Kouzaki, Gamagori; Yukihiko Okuno; Katsuyuki Hirata, both of Toyokawa, all of Japan

[73] Assignee: Minolta Co., Ltd., Osaka, Japan

[21] Appl. No.: 08/812,811

[22] Filed: Mar. 6, 1997

[30] Foreign Application Priority Data

Mar. 7, 1996 [JP] Japan .................................. 8-050163

[51] Int. Cl.[7] ...................................... G06K 9/40
[52] U.S. Cl. ........................ 382/162; 382/167; 358/530
[58] Field of Search .................... 382/162, 167, 382/254; 358/530, 532, 463

[56] References Cited

U.S. PATENT DOCUMENTS

| | | | |
|---|---|---|---|
| 4,334,244 | 6/1982 | Chan et al. | 358/166 |
| 4,878,125 | 10/1989 | Katayama et al. | 358/443 |
| 5,345,320 | 9/1994 | Hirota | 358/518 |
| 5,357,353 | 10/1994 | Hirota | 358/530 |
| 5,398,124 | 3/1995 | Hirota | 358/530 |
| 5,563,726 | 10/1996 | Suzuki et al. | 358/539 |
| 5,689,590 | 11/1997 | Shirasawa et al. | 382/254 |

*Primary Examiner*—Thomas D. Lee
*Assistant Examiner*—Stephen Brinich
*Attorney, Agent, or Firm*—McDermott, Will & Emery

[57] ABSTRACT

Pixel data comprising density data of R, G, and B obtained by reading an original with a CCD image sensor are subjected to shading correction by a shading correction unit, and then converted into color region signals H*, V, and C* in the Munsell color space by a first converter. According to the variations of V, a region discriminator determines whether each pixel data belongs to an edge portion of the original image or whether it belongs to a uniform density region of the original image. A noise removing unit performs noise removal by performing smoothing on color region signals H*, V, and C* of the pixel data which have been determined to belong to uniform density regions. A second converter converts the noise-removed color region signals into pixel data of R, G, and B.

16 Claims, 15 Drawing Sheets

| 0 | 0 | −1/4 | 0 | 0 |
|---|---|---|---|---|
| 0 | 0 | 0 | 0 | 0 |
| −1/4 | 0 | 1 | 0 | −1/4 |
| 0 | 0 | 0 | 0 | 0 |
| 0 | 0 | −1/4 | 0 | 0 |

| 1/32 | 1/16 | 1/32 |
|---|---|---|
| 1/16 | 5/8 | 1/16 |
| 1/32 | 1/16 | 1/32 |

562

| 1/16 | 1/8 | 1/16 |
|---|---|---|
| 1/8 | 1/4 | 1/16 |
| 1/16 | 1/8 | 1/16 |

563

| 1/100 | 1/50 | 1/25 | 1/50 | 1/100 |
|---|---|---|---|---|
| 1/50 | 1/25 | 2/25 | 1/25 | 1/50 |
| 1/25 | 2/25 | 4/25 | 2/25 | 1/25 |
| 1/50 | 1/25 | 2/25 | 1/25 | 1/50 |
| 1/100 | 1/50 | 1/25 | 1/50 | 1/100 |

|  |  |  |  | S601 |
|---|---|---|---|---|
| 0 | 0 | −1/4 | 0 | 0 |
| 0 | 0 | 0 | 0 | 0 |
| −1/4 | 0 | 1 | 0 | −1/4 |
| 0 | 0 | 0 | 0 | 0 |
| 0 | 0 | −1/4 | 0 | 0 |

FIG. 13

| H* | Y | C* | C | M | Y | K |
|---|---|---|---|---|---|---|
| 0 | 0 | 0 | 96 | 98 | 96 | 192 |
| 0 | 80 | 80 | 0 | 48 | 48 | 16 |
| 0 | 80 | 240 | 0 | 240 | 0 | 0 |
| 0 | 128 | 128 | 240 | 0 | 0 | 0 |
| 0 | 144 | 96 | 0 | 32 | 16 | 0 |
| 0 | 160 | 160 | 0 | 48 | 32 | 0 |
| 0 | 192 | 112 | 48 | 0 | 0 | 0 |
| 16 | 16 | 64 | 0 | 240 | 240 | 0 |
| 16 | 32 | 128 | 0 | 240 | 240 | 0 |
| 16 | 48 | 192 | 0 | 240 | 240 | 0 |
| 16 | 64 | 256 | 0 | 240 | 240 | 0 |
| 16 | 96 | 144 | 0 | 64 | 64 | 0 |
| 16 | 112 | 208 | 0 | 80 | 64 | 0 |
| 16 | 160 | 176 | 240 | 0 | 0 | 0 |
| 32 | 32 | 48 | 240 | 0 | 0 | 16 |
| 32 | 80 | 96 | 240 | 0 | 0 | 0 |
| 32 | 112 | 224 | | | | 0 |
| | | | 0 | 48 | 0 | |
| 208 | 208 | 128 | 0 | 16 | 0 | 0 |
| 224 | 64 | 16 | 16 | 16 | 16 | 48 |
| 224 | 64 | 208 | 32 | 240 | 0 | 0 |
| 224 | 96 | 144 | 0 | 80 | 0 | 0 |
| 224 | 112 | 144 | 272 | 0 | 16 | 48 |
| 224 | 128 | 32 | 0 | 0 | 0 | 16 |
| 224 | 128 | 224 | 0 | 96 | 0 | 0 |
| 224 | 160 | 176 | 0 | 48 | 0 | 0 |
| 224 | 176 | 128 | 32 | 0 | 16 | 32 |
| 224 | 192 | 48 | 0 | 0 | 0 | 0 |
| 224 | 256 | 80 | 0 | 0 | 0 | 0 |
| 240 | 32 | 128 | 16 | 240 | 0 | 0 |
| 240 | 64 | 192 | 0 | 240 | 0 | 0 |
| 240 | 80 | 96 | 240 | 0 | 16 | 32 |
| 240 | 80 | 240 | 16 | 240 | 0 | 0 |
| 240 | 128 | 208 | 0 | 96 | 16 | 0 |
| 240 | 144 | 64 | 32 | 0 | 16 | 32 |
| 240 | 160 | 192 | 240 | 0 | 0 | 16 |
| 240 | 208 | 48 | 16 | 0 | 0 | 16 |
| 240 | 208 | 112 | 0 | 16 | 16 | 0 |

| −1/8 | 0 | 0 | 0 | 1/8 |
|---|---|---|---|---|
| −1/8 | −1/8 | 0 | 1/8 | 1/8 |
| −1/8 | −1/8 | 0 | 1/8 | 1/8 |
| −1/8 | −1/8 | 0 | 1/8 | 1/8 |
| −1/8 | 0 | 0 | 0 | 1/8 |

543

| −1/8 | −1/8 | −1/8 | −1/8 | 1/8 |
|---|---|---|---|---|
| 0 | −1/8 | −1/8 | −1/8 | 0 |
| 0 | 0 | 0 | 0 | 0 |
| 0 | 1/8 | 1/8 | 1/8 | 0 |
| 1/8 | 1/8 | 1/8 | 1/8 | 1/8 |

IMAGE FORMING APPARATUS HAVING A NOISE REMOVING UNIT

BACKGROUND OF THE INVENTION (1) Field of the Invention

The present invention relates to an image forming apparatus, such as a digital color copying machine and a color facsimile machine, which reproduces a full-color image according to image data obtained by performing color-separation on an original image.

(2) Related Art

In a copying machine which reproduces an image according to image data obtained by reading an original with a scanner, the digital image data of red (R), green (G), and blue (B) obtained from an original, are transformed into data of cyan (C), magenta (M), and yellow (Y) used for color image reproduction.

During the data processing, however, image noise is caused by low scanning accuracy, poor color reproducibility of the printer, and other factors, and that is why a correction unit is necessary for an image forming machine to perform corrections.

When reproducing a full-color image, smoothness is required in uniform density regions, and the presence of even a small amount of noise is likely to catch the user's attention and thus ruin their overall impression of the image.

In the prior art, to avoid such image deterioration, image noise is reduced by performing smoothing with filters on the image data of each primary color read from the original.

In the above noise reducing method, however, there are problems that necessary image data are lost during the image processing, while noticeable noise still remains on the reproduction image due to the insufficient noise removal.

These problems arise because the conventional noise removal is performed not on the actual reproduction colors recognizable to the eye, but on the image data of primary colors R, G, and B prior to color reproduction. According to prior art, desirable effects of noise removal can be rarely obtained by smoothing, because subtle image data which need to be reproduced are lost due to unnecessary smoothing, and also because image noise small enough to be ignored at the stage of processing the image data of R, G, and B may become unfavorably large as a result of the overlap of all primary colors during color reproduction.

SUMMARY OF THE INVENTION

To eliminate the above problems, the present invention is aimed at providing an image forming apparatus which performs suitable noise removal to form an image with excellent reproducibility.

An image processing apparatus of the present invention comprises: an input unit for receiving pixel data on colors of pixels constituting an original image; a first converter for converting the received pixel data into color region signals; a noise removing unit for removing noise from the color region signals obtained by the first converter; a second converter for converting the noise-removed color region signals into pixel data of each color; and an output unit for outputting the pixel data obtained by the second converter. Also, an image forming apparatus of the present invention comprises: an input unit for receiving pixel data on colors of pixels constituting an original image; a first converter for converting the received pixel data into color region signals; a noise removing unit for removing noise from the color region signals obtained by the first converter; a second converter for converting the noise-removed color region signals into pixel data on colors; and an image forming unit for forming an image according to the pixel data obtained by the second discriminator.

According to the present invention, image data are converted into color region signals in a uniform color space, noise removal is performed on the color region signals, the noise-removed color region signals are converted into image data of colors, and then a reproduction image is formed in accordance with the obtained image data. Thus, suitable noise removal can be performed on the color region signals corresponding to the actual colors recognizable to the eye, and the problems such as lost image data and remaining image noise can be avoided to form an image with excellent reproducibility.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 8 shows example smoothing filters used in a noise removing unit in the image signal processing unit.

FIG. 13 shows an example lookup table set in a CMY convertor in the image signal processing unit.

FIG. 15 shows example primary differential filters set in the region discriminator.

DESCRIPTION OF THE PREFERRED EMBODIMENTS

The following is an explanation of the embodiments of the image forming apparatus of the present invention applied to a digital color copying machine.

Figure 1:
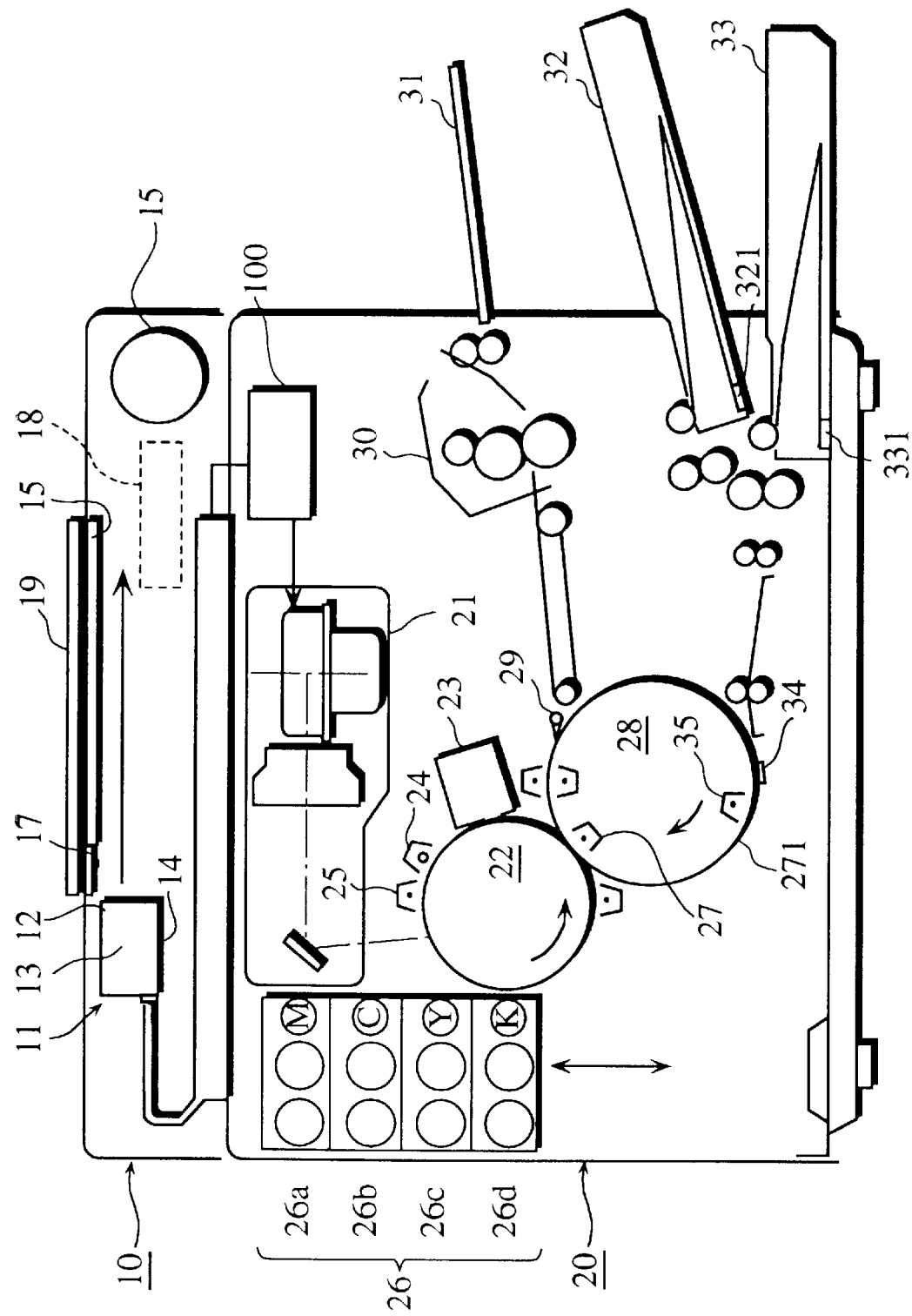
FIG. 1 shows the overall structure of a digital color copying machine according to the first embodiment of the present invention.

(1) First Embodiment (1-1) Overall Structure of the Digital Color Copying Machine FIG. 1 shows the overall structure of the digital color copying machine of the present invention.

The digital color copying machine mainly comprises an image reading unit 10 for reading an original image and a printing unit 20 for reproducing the image read by the image reading unit 10.

A scanner 11 in the image reading unit 10 includes an exposure lamp 12 for irradiaing an original, a rod lens array 13 for gathering reflection light from the original, and a contact-type CCD color image sensor 14 (hereinafter referred to simply as a CCD sensor) for transforming the gathered light into electric signals.

Figure 2:
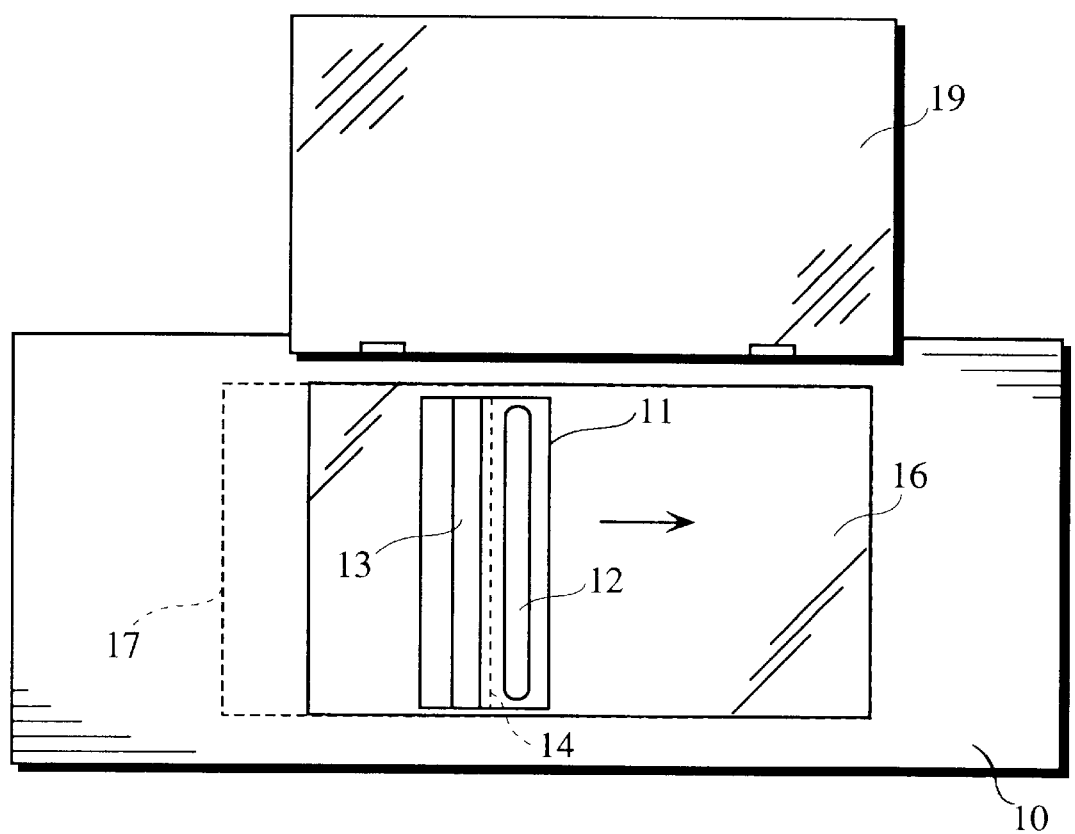
FIG. 2 is a top view of an image reader unit in the digital color copying machine.

An original cover 19 is capable of moving with one side of it fixed to the main body (see FIG. 2). The original cover 19 fixes an original onto an original glass plate 16 when scanning, and prevents the exposure lamp light from leaking outside.

FIG. 2 shows a top view of the image reading unit 10 with the original cover 19 lifted up. In a scanner 11, the exposure lamp 12 and the CCD sensor 14 are disposed in parallel with each other in the direction perpendicular to the direction of the arrow (the subscan direction) in FIG. 2. The exposure lamp 12 and the CCD sensor 14 have the same width as the original glass plate 16. By the left side of the original glass plate 16, a white standard plate 17 used for shading correction is provided.

When reading an original, the scanning unit 11 is driven by a motor 15 and moves in the direction of the arrow to scan the original placed on the transparent original glass plate 16.

The CCD sensor 14 is provided with filters (not shown in this figure) for red (R), green (G), and blue (B). The reflection light from the original irradiated by the exposure lamp 12 in the scanning unit 11 goes through the filters in the CCD sensor 14 and is transformed into electric signals. Threecolor image data of red (R), green (G), and blue (B) are thus generated.

The multi-valued electric signals of red (R), green (G), and blue (B) goes through a process (mentioned below) in an image signal processing unit 120 (shown in FIG. 3) in a control unit 100, and are transformed into density data of yellow (Y), magenta (M), cyan (C), and black (K).

These density data are subjected to gamma correction or dither processing depending on the gradient characteristics in a printer control unit 130 (shown in FIG. 3) in the control unit 100. The density data are then outputted to a printer head unit 21 as output control signals. For every reproduction color, the printer head unit 21 exposes the surface of a photosensitive drum 22 by emitting strong laser light in accordance with the output control signals.

Prior to the exposure, the remaining toners on the surface of the photosensitive drum 22 have been removed by a cleaner 23, and the photosensitive drum 22 has been irradiated by an eraser lamp 24 and charged uniformly by a sensitizing charger 25. When the exposure is performed on the photosensitive drum 22 in the uniformly charged state, an electrostatic latent image is formed on the surface of it.

A toner developing unit 26 provided with toner developers 26a–26d corresponding to magenta, cyan, yellow, and black, is moved up and down by an elevating unit (not shown) in synchronization with the rotation of the photosensitive drum 22. One of the toner developers 26a–26d corresponding to the color of the formed electrostatic latent image is selected to develop the electrostatic latent image on the surface of the photosensitive drum 22.

Figure 3:
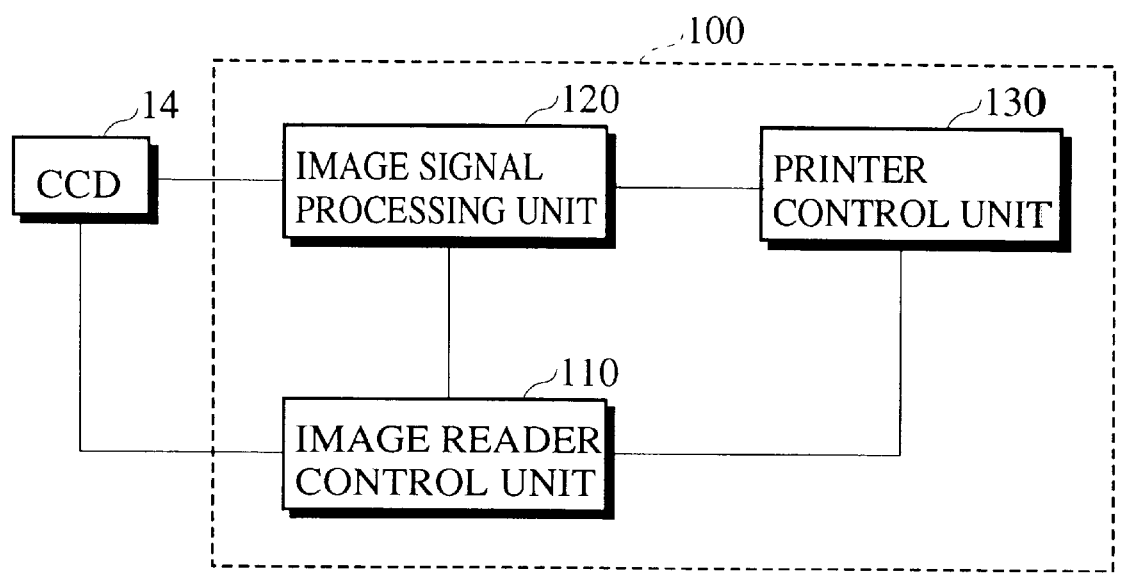
FIG. 3 is a block diagram of a control unit in the digital color copying machine.

Meanwhile, a transfer drum 28 is supplied with copying papers (not shown) of a preferred size by selecting one of paper cassettes 32 and 33 by the printer control unit 130 (shown in FIG. 3). The paper cassette selection is performed in accordance with detection signals from paper size detection sensors 321 and 331 disposed on the paper cassettes 32 and 33. The paper size detection sensors 321 and 331 are formed by photoelectric sensors or the like. The front edge of a copying paper is then held by a chucking mechanism 34 disposed on the transfer drum 28, and electrostatically pulled by a suction charger 35 so that the copying paper does not slip on the transfer drum 28. The image developed on the photosensitive drum 22 is then transferred onto the copying paper on the transfer drum 28 by a transfer charger 27.

The above printing process is repeated for all the colors of magenta, cyan, yellow, and black, and when the printing of all the colors has been finished, a separation claw 29 is activated to separate the copying paper from the surface of the transfer drum 28.

Since the toner image transferred onto the copying paper can be easily removed, the toners are fixed onto the surface of the copying paper by heating and pressing with a fixing unit 30. The copying paper with the fixed toner image is then discharged onto a paper tray 31.

An operation panel 18 is disposed on the front side of the image reading unit 10 so that is it easy for users to operate. The operation panel 18 comprises a 10-keypad for inputting the number of copies to be made and a start key for starting the operation.

The following explanation is for the structure of the control unit 100 of the digital color copying machine, with reference to the block diagram of FIG. 3.

The control unit 100 consists of an image reader control unit 110, an image signal processing unit 120, and a printer control unit 130.

The image reader control unit 110 controls the operations of the image reading unit 110 when reading an original. The operations of the image reading unit 10 include switching on and off the CCD sensor 14 and the exposure lamp 12, and scanning the original with the scanner 11 driven by the motor 15.

The image signal processing unit 120 processes the image data of red (R), green (G), and blue (B) sent from the CCD sensor 14 in the scanner 11, and transforms the image data into the image data of the reproduction colors of magenta (M), cyan (C), yellow (Y), and black (K) to achieve the optimum reproduction images. (Hereinafter, red, green, and blue will be referred to simply as "R, G, and B" or "r, g, and b", and the reproduction colors of yellow, magenta, cyan, and black will be referred to simply as "Y, M, C, and K", respectively.)

The printer control unit 130 controls the operation of each part of the printer unit 20. It performs gamma correction on the image data outputted from the image signal processing unit 120, controls the output of the printer head unit 21 by performing dither processing when a multi-valued dither method is used as a gradation expressing technique. The printer control unit 130 also controls the synchronization of the following actions: the paper supply from the paper cassette 32 or 33; the rotation of the photosensitive drum 22 and the transfer drum 28; the vertical movement of the toner developing unit 26; and the charge supply for each charger.

(1-2) Structure of the Image Signal Processing Unit

Figure 4:
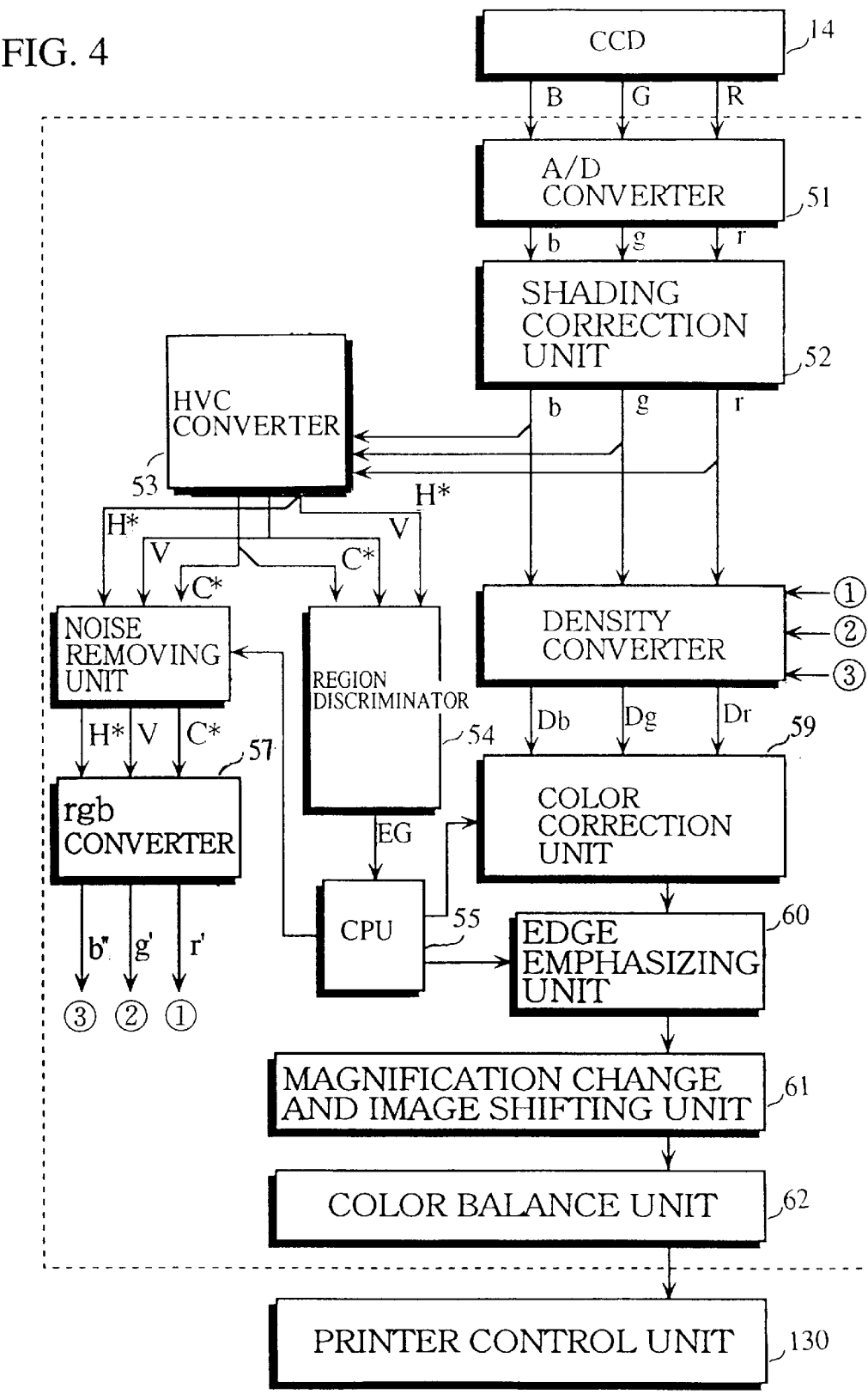
FIG. 4 is a block diagram of an image signal processing unit in the control unit.

The following is an explanation of the structure of the image signal processing unit 120, with reference to the block diagram of FIG. 4.

The image signals photoelectrically converted by the CCD sensor 14 in the scanner 11 are further converted into multi-valued digital image data of R, G, and B by an A/D convertor 51.

The A/D converted image data are then subjected to shading correction by a shading correction unit 52. This shading correction is aimed at correcting uneven irradiation by the exposure lamp 12 and irregular sensitivity of the CCD sensor 14. A white standard plate 17 (shown in FIG. 1) disposed at an edge portion of the platen 16 is pre-scanned to obtain image data of the standard white. Here, a multiplication ratio for each pixel of the white image is determined and then stored in the internal memory of the shading correction unit 52. When reading an original, corrections are performed by multiplying each pixel data by the multiplication ratio stored in the internal memory.

The image data which have been subjected to the shading correction are inputted into an HVC converter 53, and then converted into data of hue (H*), lightness (V), and saturation (C*), which are color region signals in the uniform color space of the Munsell color system (hereinafter referred to as "Munsell color space").

The image data of r, g, and b are converted into signal values v, $\alpha$, and $\beta$ by Equation (1).

$$\begin{pmatrix} V \\ \alpha \\ \beta \end{pmatrix} = \begin{pmatrix} a_{11} & a_{12} & a_{13} \\ a_{21} & a_{22} & a_{23} \\ a_{31} & a_{32} & a_{33} \end{pmatrix} \times \begin{pmatrix} r \\ g \\ b \end{pmatrix} \quad (1)$$

wherein the conversion coefficients made up of 3×3 elements $a_{11}$–$a_{33}$ are predetermined from the transmission characteristics of the filters for color separation. Equation (2) shows an example of the conversion coefficients.

$$\begin{pmatrix} 0.3 & 0.6 & 0.1 \\ 1.0 & -0.8 & 0.1 \\ -0.3 & -0.6 & 1.0 \end{pmatrix} \quad (2)$$

Figure 5:
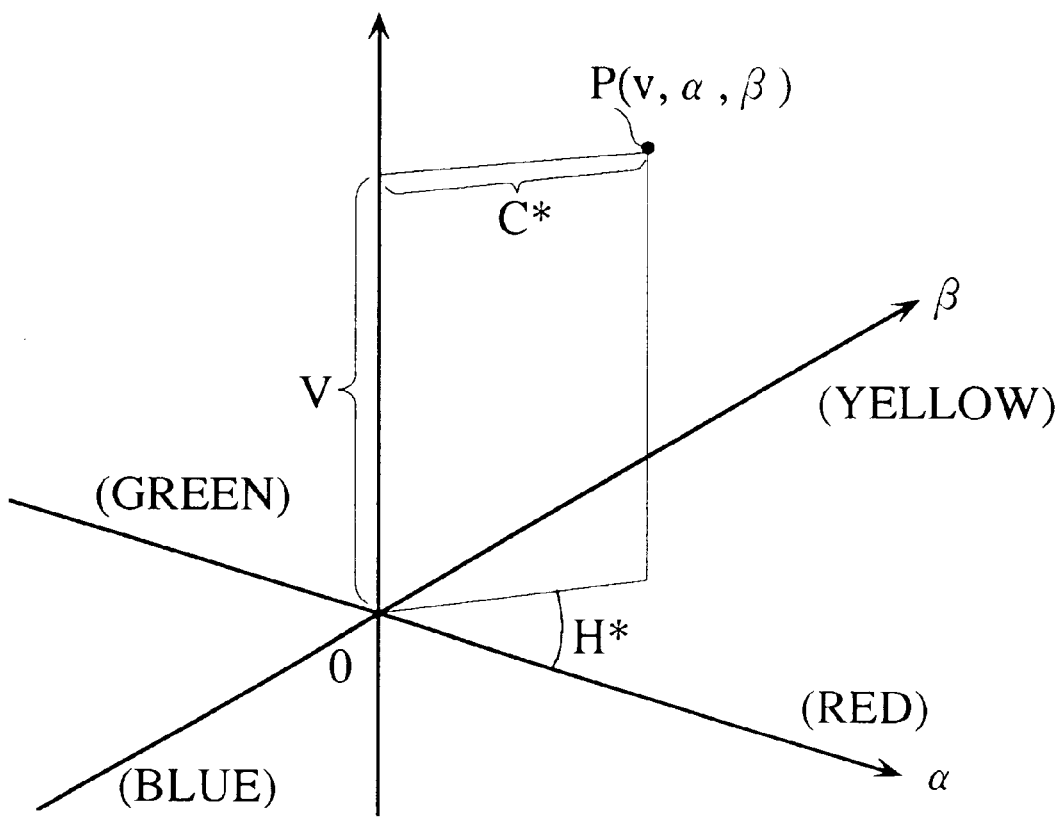
FIG. 5 shows a coordinate system of the Munsell color space.

FIG. 5 shows a coordinate system of the Munsell color space, in which the ordinate axis represents lightness, and other two transverse axes represent color tone. An axis $\alpha$ represents the degree of red in the positive direction and the degree of green in the negative direction. An axis $\beta$ represents the degree of yellow in the positive direction and the degree of blue in the negative direction. The lightness (V) at point P in the color space is equal to v, and saturation (C*) and hue (H*) can be determined by the following Equations (3) and (4).

$$C^* = (\alpha^2 + \beta^2)^{1/2} \quad (3)$$

$$H^* = (^{256}/_{360}) \times \tan^{-1}(\beta/\alpha) \quad (4)$$

The hue (H*) is generally indicated by the angles of 0° to 360°, but in Equation (3) the hue (H*) can be represented in 256 levels (8-bit) by multiplying the angles by the coefficient of (256/360).

Using those Equations, the HVC converter 53 converts the image data of r, g, and b into the color region signals of saturation (C*), lightness (V), and hue (H*), which are outputted to both a region discriminator 54 and a noise removing unit 56.

In the region discriminator 54, it is judged whether each converted image data belongs to a uniform density region or whether it belongs to an edge portion.

Figures 6, 7:
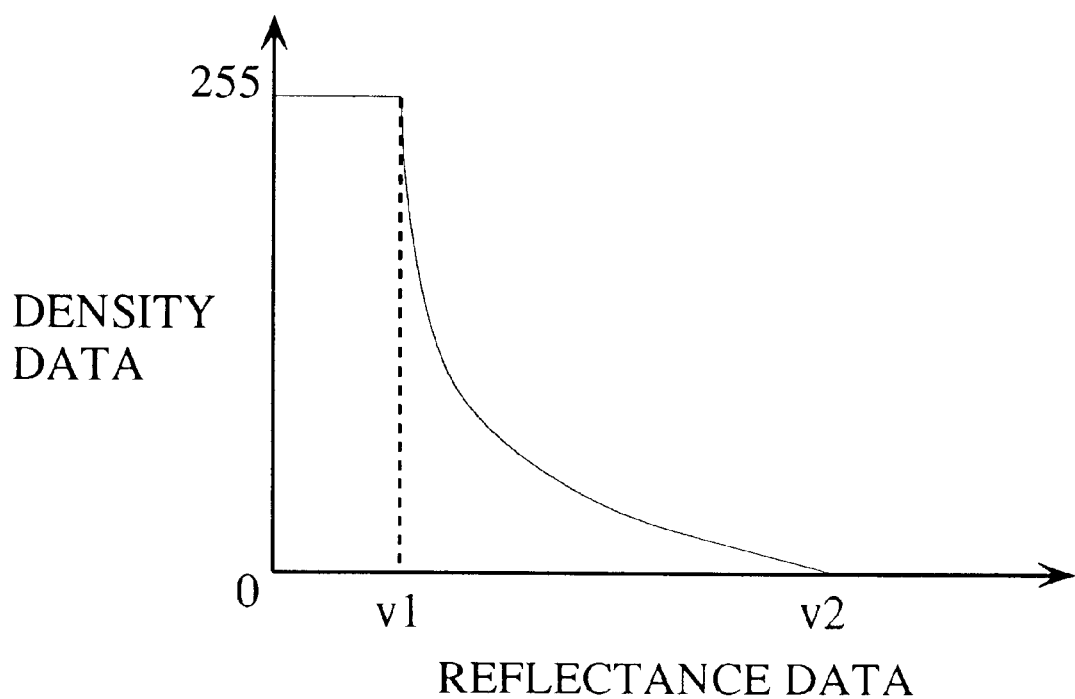
FIG. 6 shows an example of Laplacian filter used for edge detection by a region discriminator in the image signal processing unit.
FIG. 7 shows a characteristic curve representative of the relationship between reflectance data and density data.

In the region discriminator 54, the data on lightness (V) of a central pixel and its periphery pixels are subjected to two-dimensional filtering to obtain Laplacian output $\Delta V$ using a Laplacian filter 541 shown in FIG. 6.

The Laplacian filter is also known as the second differential filter, and the Laplacan output indicates distinctive values for the image data of the edge portions. When the Laplacian output exceeds a predetermined threshold value Vth, the image data is judged to belong to an edge portion. When it is below the threshold value Vth, the image data is judged to belong to a uniform density region. These judgements are outputted to the CPU 55 as region discriminating information EG.

The CPU 55 instructs the noise removing unit 56 to perform smoothing and noise removal on the image data of H, V, and C which have been judged to belong to a uniform density region.

The noise removing unit 56 performs smoothing on the color region signals of the image data using spatial filters in response to the instructions from the CPU 55. Image noise is reduced by performing moving average with weighting addition on the periphery pixels around the central pixel using two-dimensional smoothing filters. Thus, smooth images of high quality can be achieved.

The noise removing unit 56 is provided with three types of smoothing filters 561, 562, and 563 shown in FIG. 8. The degree of smoothness becomes higher in numeric order. Smoothing is performed by selecting one of the filters, and the filter to be chosen is predetermined by the user according to the image quality of the original.

Since smoothing with suitable smoothing filters is performed on the color region signals of hue, lightness, and saturation, which are close to the actual colors recognizable to the eye, noise removal can be performed more accurately compared to the conventional method of performing smoothing on each primary color prior to color reproduction. Also, remaining noise can be effectively reduced and subtleties in the original image is not lost on the reproduction image.

Each color region signal which has been subjected to noise removal by the noise removing unit 56 is then subjected to calculation shown by Equation (5), which is the reverse of Equation (1) in the HVC converter 53 mentioned above. Here, the color region signals are reversely converted into image data of r', g', and b', and outputted to a density converter 58.

$$\begin{pmatrix} r' \\ g' \\ b' \end{pmatrix} = \begin{pmatrix} a_{11} & a_{12} & a_{13} \\ a_{21} & a_{22} & a_{23} \\ a_{31} & a_{32} & a_{33} \end{pmatrix}^{-1} \times \begin{pmatrix} \alpha \\ \beta \\ v \end{pmatrix} \quad (5)$$

To the density converter 58, the image data of r, g, and b have also been inputted directly from the shading correction unit 52 prior to smoothing. The density converter 58 selects either the image data from the rgb converter 57 or the image data from the shading correction unit 52 in response to the instructions from the CPU 55, and converts them into density data.

When the image data is judged to belong to a uniform density region according to the instructions from the CPU 55, the density converter 58 selects the image data outputted from the rgb converter 57 by an internal selector, and converts them into density data. When the image data is judged to belong to an edge portion, the density converter 58 selects the image data outputted directly from the shading correction unit 52, and converts them into density data.

This conversion into density data is necessary, because the image data in the step of shading correction (including the image data which have been freed of noise and reversely converted into the data of r, g, and b by the noise removing unit 56) are still the reflectance data of the original, and the data of reproduction colors are needed to be converted into the density data of the actual image.

The CCD sensor 14 has photoelectric conversion characteristics, the output of which is propotional to the incident strength (the reflection ratio of the original). The reflection ratio of the original, however, is not proportional to the density of the original, and the relationship between them can be represented by a logarithmic curve. FIG. 7 shows an example of such logarithmic curve, in which the abscissa axis indicates the value of the reflectance data, while the ordinate axis indicates the value of the density data. According to this logarithmic curve, the minimum value v1 to the maximum value v2 of the reflectance data are converted into density data, and the maximum density gradation value of the density data is 255. Thus, the density data DR, DG, and DB which are proportional to the density of the original can be obtained.

These density data are then inputted into a color correction unit 59.

The color correction unit 59 generates density data K' of pure black from the density data DR, DG, and DB which correspond to R, G, and B.

This black color generation is necessary, because pure black is hard to reproduce by the overlapping of C, M, and Y toners, due to the adverse influence of the spectral characteristics of each toner. From this point of view, the black color generation is performed as follows.

Figures 9, 10:
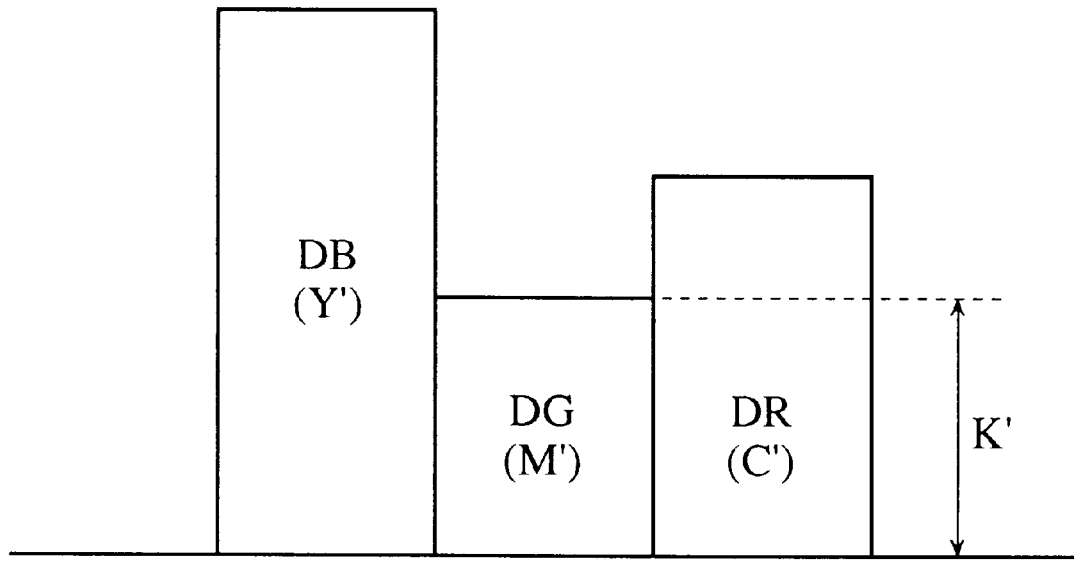
FIG. 9 shows how to determine the black density from the density data of red, green, and blue.
FIG. 10 shows an example edge emphasizing filter used in an edge emphasizing unit in the image signal processing unit.

Since the black density data K' is common to DR, DG, and DB (shown in FIG. 9), each value of the density data of C, M, and Y, which are complementary to R, G, and B, is logically equal to the value obtained by subtracting the black data K' from each of the density data DR, DG, and DB. As can be seen from FIG. 9, however, the density of each reproduction color is extremely low, and the black stands out in the reproduction image, which shows extremely low saturation as a result.

To solve this problem, each of the density data C', M', and Y' corresponding to C, M, and Y is determined by subtracting p·K' from each of the density data DR, DG, and DB, and the black density data is given by q·K'. The coefficients p and q are used to adjust each density value.

The former process is called Undercolor Removal process (UCR process), while the latter is called Black Paint process (BP process). These processes are represented by the following Equations:
(UCR process)

$$C'=Dr-p\cdot K'$$

$$M'=Dg-p\cdot K'$$

$$Y'=Db-p\cdot K'$$

(BP process)

$$K=q\cdot K'$$

In the above Equations, the coefficient p is the UCR ratio, and the value of each color data becomes smaller as the UCR ratio becomes larger. The coefficient q is the BP ratio, and the value of the black data becomes larger proportionally to the BP ratio.

Accordingly, the UCR ratio and the BP ratio have influence on the saturation of chromatic colors and the visibility of achromatic colors. A suitable value of each ratio for reproducing an image is set in the color correction unit 59 in advance.

The density data C', M', and Y' of the reproduction colors C, M, and Y are then subjected to masking.

As described above, R, G, and B are complementary to C, M, and Y, and two colors in a complementary relation with each other should have the same density. In practice, however, the transmission characteristics of the filters for R, G, and B in the CCD sensor 14 do not change proportionally to the reflection characteristics of the toners of C, M, and Y in the printing unit. Therefore, it is necessary to match both characteristics with one another, so that the color reproducibility becomes as high as possible.

The values of the density data of C, M, and Y determined in the UCR process described above are given by subtracting the predetermined density of K from each of the density values of C', M', and Y', i.e., the density values DR, DG, and DB. For this reason, the masking process is necessary, and a linear correction is performed according to a linear masking equation shown by the following Equation (7) using a masking coefficient M shown by Equation (6):

$$M = \begin{pmatrix} m_{11} & m_{12} & m_{13} \\ m_{21} & m_{22} & m_{23} \\ m_{31} & m_{32} & m_{33} \end{pmatrix} \quad (6)$$

$$\begin{pmatrix} C \\ M \\ Y \end{pmatrix} = M \begin{pmatrix} C' \\ M' \\ Y' \end{pmatrix} \quad (7)$$

Each element of $m_{11}$–$m_{33}$ of the masking coefficient M in Equation (6) is determined from the transmission characteristics of the filters and the reflection characteristics of the toners.

Having been determined by the BP process, the black density data K does not need to be subjected to masking.

The density data of C, M, Y, and K which have been subjected to color correction by the color correction unit 59 are sent to an edge emphasizing unit 60, where the density data are processed as image data.

The edge emphasizing unit 60 receives the instructions from the CPU 55. When the inputted image data belongs to a uniform density region, the edge emphasizing unit 60 outputs it without performing edge emphasizing. When the density data belongs to an edge portion, the edge emphasizing unit 60 performs edge emphasizing on the density data using an edge emphasizing filter 601 shown in FIG. 10.

The image data outputted from the edge emphasizing unit 60 is then sent to a magnification change and image shifting unit 61, where the magnification is changed to a predetermined value or the reproduction image is shifted to a predetermined position. The image data is further sent to a color balance unit 62, where the color balance is adjusted, and the image data is finally outputted to the printer control unit 130.

The noise removal by the noise removing unit 56 and the edge emphasizing by the edge emphasizing unit 60 are generally known as MTF (modulation transfer function) corrections, because they both spatially perform a correction on the image data of each pixel (pixel data) using a two-dimensional filter.

Figure 11:
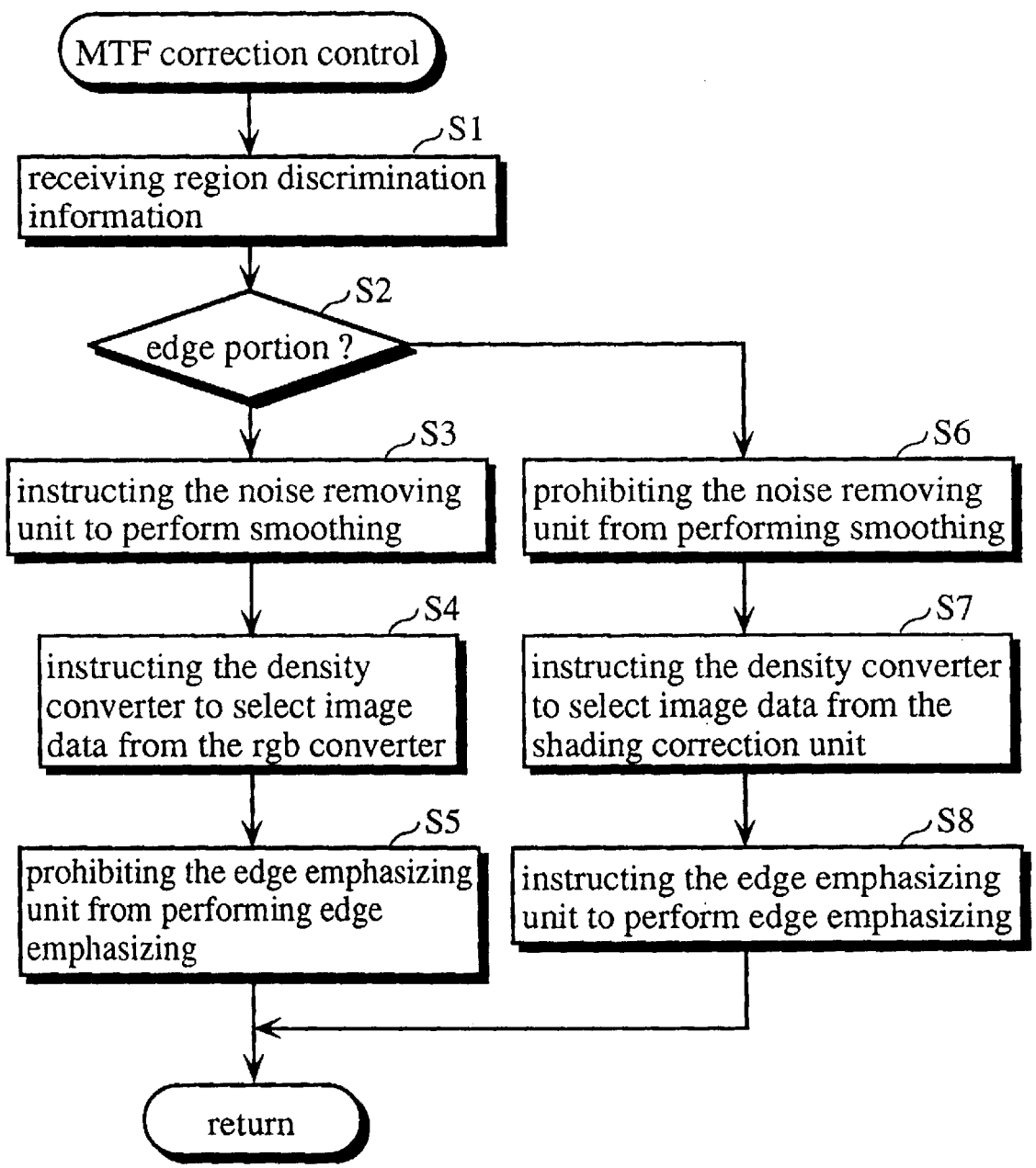
FIG. 11 is a flowchart illustrating the control operation of MTF corrections by the CPU in the image signal processing unit.

The following is an explanation of the control operations of the CPU 55 in MTF corrections, with reference to the flowchart of FIG. 11.

The CPU 55 receives region discrimination information EG from the region discriminator 54 (in FIG. 4), and determines whether the image data belongs to an edge portion or whether it belongs to a uniform density region. When the image data is judged to belong to a uniform density region, the CPU 55 instructs the noise removing unit 56 to perform smoothing on the HVC-converted image data (steps S1, S2, and S3), and it also instructs the density converter 58 to select and adjust each density of the image data r', g', and b' obtained by the rgb converter 57 (step S4). The CPU 55 further instructs the edge emphasizing unit 60 to perform no edge emphasizing on the image data and output it directly (step S5).

When the image data is judged to belong to an edge portion from the region discrimination information EG, the CPU 55 instructs the noise removing unit 56 to perform no smoothing on the HVC-converted image data (steps S2 and S6), and it also instructs the density converter 58 to select and adjusts each density of the image data of r, g, and b directly outputted from the shading correction unit 52 (step S7). The CPU 55 further instructs the edge emphasizing unit 60 to perform edge emphasizing on the image data and output it (step S8).

The control operations for the MTF corrections are repeated for all pixel data. By doing so, the image data corresponding to the uniform density regions of the original image are converted into signals of H*, V, and C* in a uniform color space, followed by smoothing. As for the image data corresponding to the edge portions, those which have not been converted into HVC signals are subjected to edge emphasizing. In the uniform density regions, noise removal is performed, while in the edge portions, edge emphasizing is performed, and the reproduction image obtained here exhibits good smoothness, high resolution, and excellent reproducibility.

(2) Second Embodiment

In the image signal processing unit in the digital color copying machine of the first embodiment, the HVC converter converts the primary-color image data corresponding to the uniform density regions into color region signals in a uniform color space, and after smoothing of the color region signals, they are reversely converted into primary-color image data. In this embodiment, however, the color region signals are converted directly into density data of the reproduction colors C, M, Y, and K.

Accordingly, the structure of the digital color copying machine of this embodiment is the same as in the first embodiment, except for the structure of the image signal processing unit.

Figure 12:
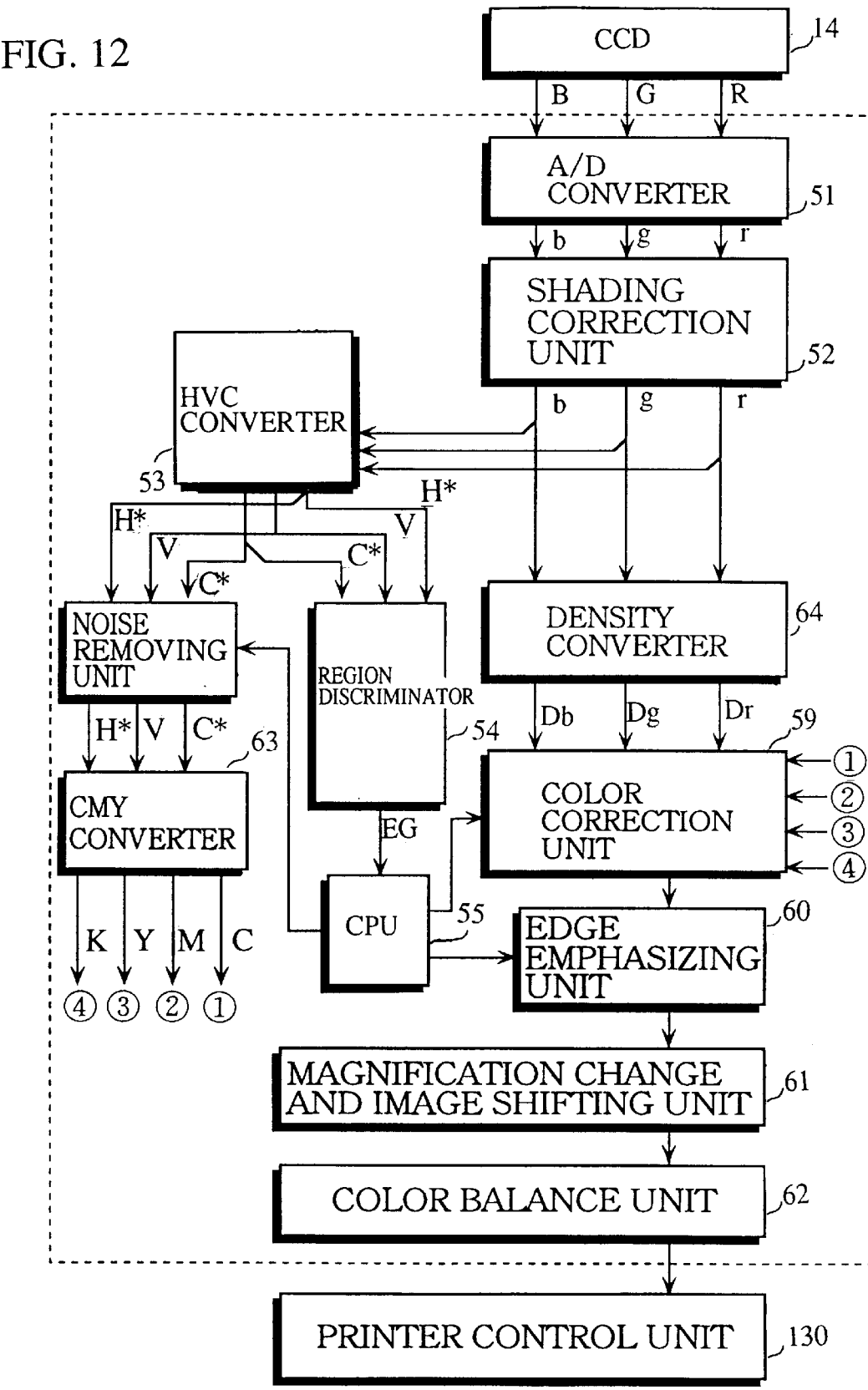
FIG. 12 is a block diagram of an image signal processing unit according to the second embodiment of the present invention.

FIG. 12 is a block diagram of the image signal processing unit 121 in this embodiment. In this figure, the same elements as shown in FIG. 4 are indicated by the same numeral references, and therefore explanations for them are not provided below.

The image data photoelectrically converted by the CCD sensor 14 of the scanner 11 are converted into multi-valued digital image data of R, G, and B by the A/D converter 51.

The A/D converted data are subjected to shading correction by the shading correction unit 52, and inputted into the HVC converter 53, where they are further converted into color region signals of hue (H*), lightness (V), and saturation (C*) in the Munsell color space, and outputted to the region discriminator 54 and the noise removing unit 56.

As in the first embodiment, the region discriminator 54 determines whether each image data belongs to a uniform density region or whether it belongs to an edge portion of the original image, and it sends the discrimination results to the CPU 55 as region discrimination information EG.

When the region discrimination information EG indicates that the image data belongs to a uniform density region, the CPU 55 instructs the noise removing unit 56 to perform smoothing on the image data.

Upon receipt of the instruction, the noise removing unit 56 performs smoothing on the color region signals according to the method of moving average with weighting addition to the periphery pixels of a central pixel. By doing so, image noise in the uniform density regions can be removed. The smoothed color region signals are then sent to a CMY converter 63.

The CMY converter 63 generates density data of the reproduction colors C, M, Y, and K in accordance with the noise-removed data of H*, V, and C* obtained through smoothing.

More specifically, the CMY converter 63 contains a lookup table (hereinafter referred to as LUT) 571 in which the density data of C, M, Y, and K are set corresponding to the values of H*, V, and C* as shown in FIG. 13. Each of the density values of C, M, Y, and K is determined in accordance with this LUT 571.

The values shown in the columns of H*, V, and C* on the left side of the table indicate the lowest values within the ranges of the color region signals. The color region signal values are represented by 8 bits (256 levels), while the ranges of them are represented by 4 bits (16 levels). For instance, the value "224" shown in the column of H* indicates that the data value of H* is in the range of 224 to 240.

The values in the columns of C, M, Y, and K on the right side of the LUT 571 are predetermined density data values of the reproduction colors after the above-mentioned color corrections (UCR process, BP process, and masking process). With these density data values, the color region signals of H*, V, and C* can be converted directly into density data of the reproduction colors, without going through the tedious process of being reversely converted into the reflectance data of R, G, and B, and then converted into density data, followed by color correction.

The density data of C, M, Y, and K are inputted into the selector (not shown) in the color correction unit 65. The density data DR, DG, and DB obtained by the density converter 64 and outputted from the shading correction unit 52 are also inputted into the selector. Upon receipt of the information from the CPU 55 that the image data belongs to a uniform density region, the selector selects the density data of C, M, Y, and K outputted from the CMY converter 63 and sends them to the edge emphasizing unit 60.

Upon receipt of the information from the CPU 55 that the image data belongs to an edge portion, the selector selects the density data DR, DG, and DB outputted from the density converter 64, and subjects them to color corrections (UCR process, BP process, and masking process) explained in the first embodiment. Thus, the density data of C, M, Y, and K are generated and sent to the edge emphasizing unit 60.

The edge emphasizing unit 60 receives the instructions from the CPU 55. When the inputted density data belongs to a uniform density region, the edge emphasizing unit 60 performs no edge emphasizing on the density data. When the density data belongs to an edge portion, the edge emphasizing unit 60 performs edge emphasizing on it using an edge emphasizing filter.

The image data outputted from the edge emphasizing unit 60 is sent to a magnification change and image shifting unit 61, where the magnification is changed to a predetermined value or the reproduction image is shifted to a predetermined position. The image data is further sent to a color balance unit 62, where the color balance is adjusted, and the image data is finally outputted to the printer control unit 130.

Figure 14:
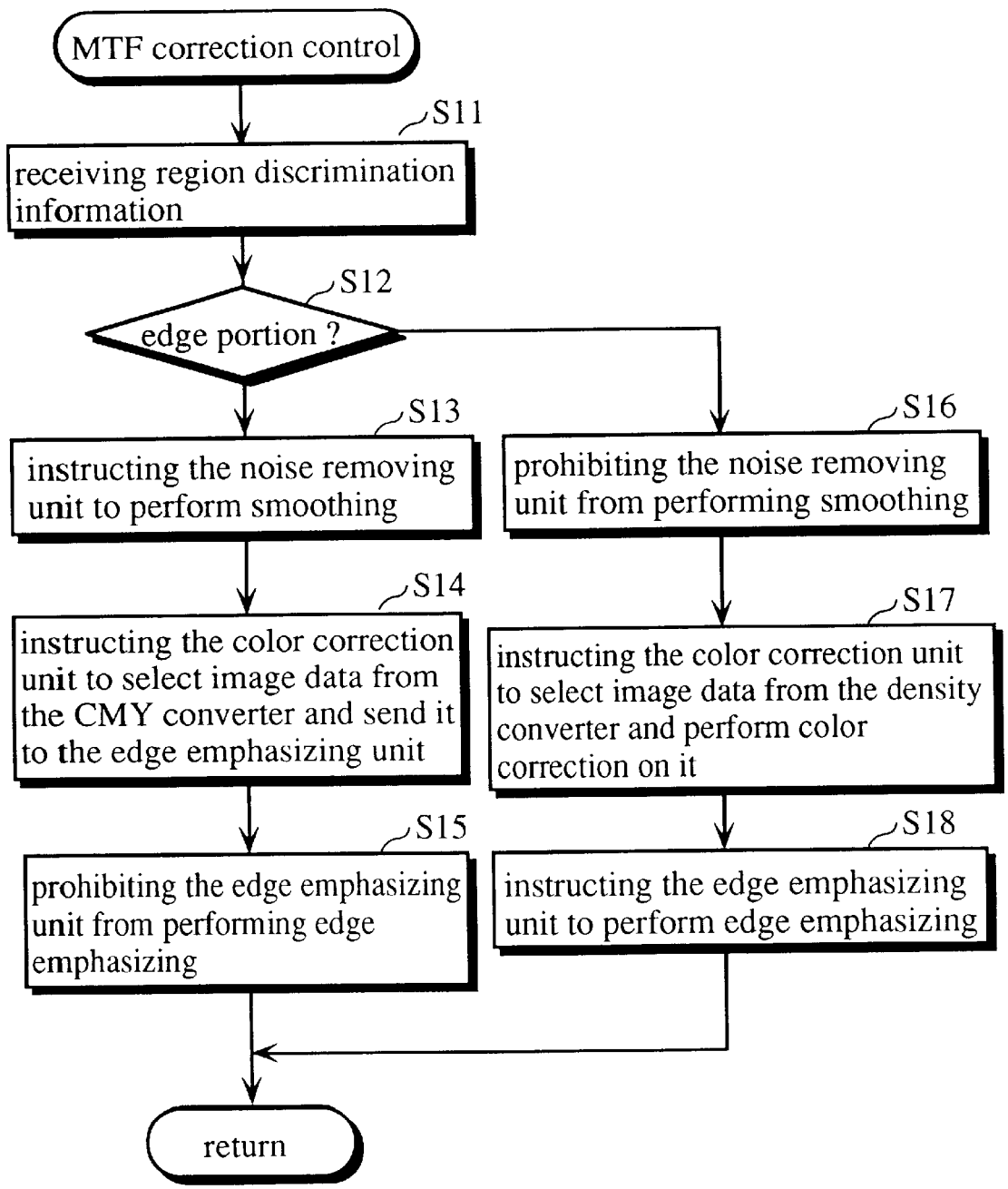
FIG. 14 is a flowchart illustrating the control operation of MTF corrections by the CPU in the image signal processing unit.

Referring to the flowchart of FIG. 14, the following is an explanation of the control operations of the CPU 55 for the MT corrections (noise removal and edge emphasizing).

The CPU 55 receives the region discrimination information EG from the region discriminator 54, and according to the information EG, it determines whether each image data belongs to a uniform density region or whether it belongs to an edge portion (steps S11 and S12). When the image data is judged to belong to a uniform density region, the CPU 55 instructs the noise removing unit 56 to perform smoothing on the HVC-converted image data (step S13), and also instructs the color correction unit 65 to select the noise-removed image data outputted from the CMY converter 63 and output it directly to the edge emphasizing unit 60 (step 14). The CPU 55 further instructs the edge emphasizing unit 60 to output the image data without performing edge emphasizing on it (step 15).

When the image data is judged to belong to an edge portion from the region discrimination information EG, the CPU 55 instructs the noise removing unit 56 to perform no smoothing on the HVC-converted image data (steps S12 and S16), and it also instructs the color correction unit 65 to select and adjust each density of the image data of r, g, and b outputted directly from the shading correction unit 52 (step S17). The CPU 55 further instructs the edge emphasizing unit 60 to perform edge emphasizing on the image data (step S18).

The control operations for the MTF corrections are repeated for the image data of all pixels. By doing so, as in the first embodiment, uniform density regions become smoother with the image noise desirably removed, and edge portions are more sharpened. Thus, a reproduction image obtained here exhibits good smoothness, high resolution, and excellent reproducibility.

Moreover, the noise-removed color region signals has the advantage that prompt data processing can be performed as the color region signals are directly converted into the density data of the reproduction colors C, M, Y, and K by the CMY converter.

(3) Modifications

Although the present invention has been described by way of the above embodiments, it should be noted that the present invention is not limited to these embodiments and the following modifications can be made in the present invention.

(3-1) In the above embodiments, the region discriminator 54 subjects the lightness data (V) to filtering using a Laplacian filter to detect edge portions. However, the edge detection may be performed in the following manner. Using primary differential filters 542 and 543 in the longitudinal and transverse directions, the primary differential data $\Delta Vv$ and $\Delta Vh$ are obtained, respectively. According to the differential data, the average value dV is calculated by $(\Delta Vv + \Delta Vh)/2$. Then, the average value dV is compared with a predetermined threshold value to perform edge detection.

(3-2) Edge detection may also be performed in the following manner.

The average density data obtained by taking an average of the density data of R, G, and B are subjected to filtering using the same primary differential filters as in (3-1) to obtain a primary differential value $\Delta D$.

Figure 16:
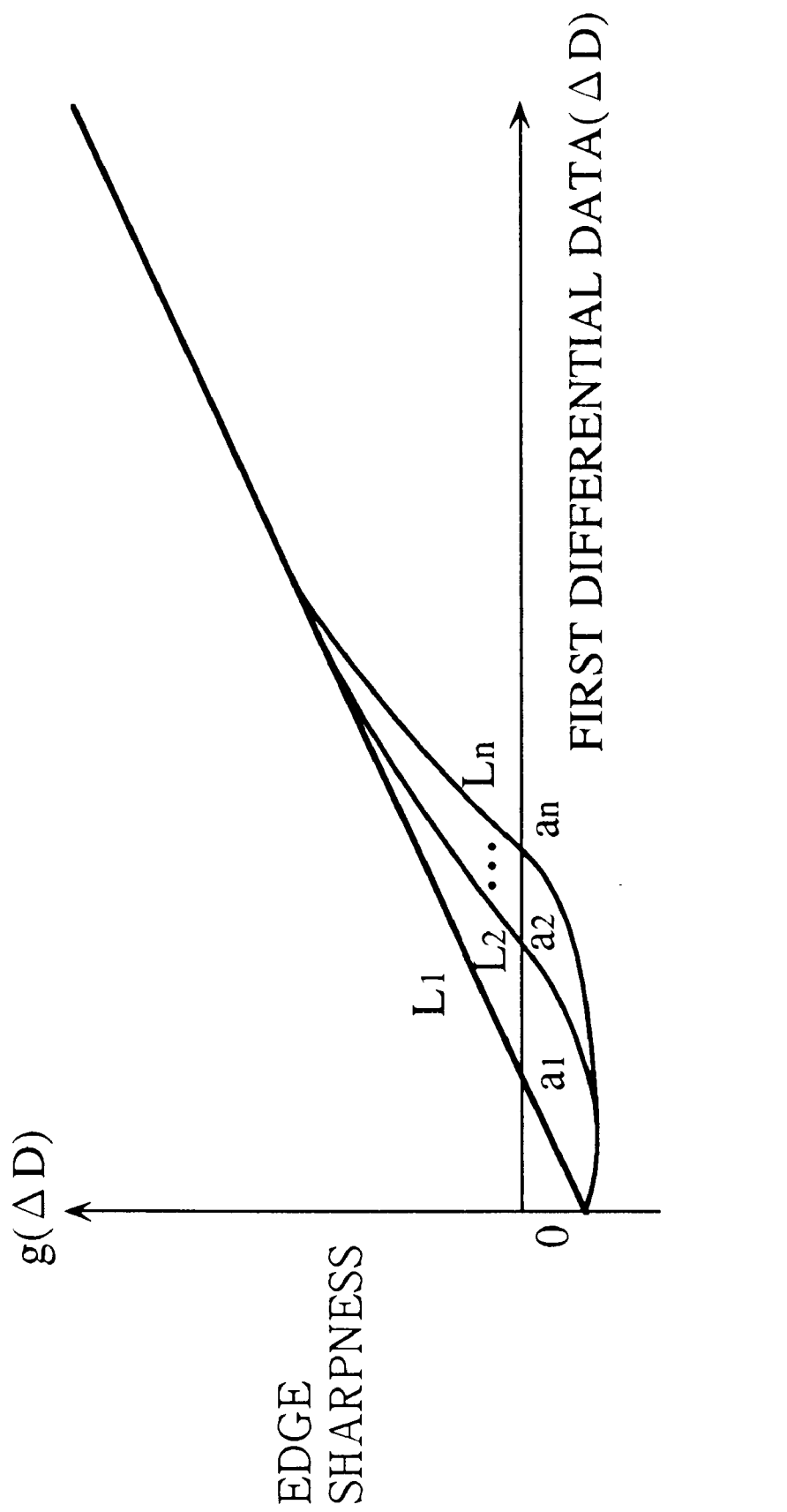
FIG. 16 shows the relationship between the Laplacian output of the lightness of image data and the edge sharpness.

The relationship between the primary differential value $\Delta D$ and the edge sharpness is represented by an edge sharpness characteristic curve Ln (n=1, 2, 3, . . . ) shown in FIG. 16. In this figure, the abscissa axis indicates the value of the primary differential data $\Delta D$, while the ordinate axis indicates where a portion is judged to be an edge portion (the edge sharpness).

Here, g indicates a function represented by the characteristic curve, and when $g(\Delta D)$ is larger than 0, the image data is judged to belong to an edge portion.

The characteristic curve is predetermined statistically and experimentally from the image resolution of the copying machine or image quality of the original. The threshold value $a_n$ (n=1, 2, 3, . . . ) is determined accordingly, and from the function g with a large threshold value $a_n$, pixel data is unlikely judged to belong to an edge portion.

When noise is noticeable in a uniform density region of the original image, the threshold value an is set at a large value so that the uniform density region is not mistaken for an edge portion.

The region discriminator 54 substitutes the primary differential data $\Delta D$ in the function $g(\Delta D)$ represented by the characteristic curve Ln. When $g(\Delta D)$ is larger than 0, the image data is determined to belong to an edge portion. Otherwise, the image data is determined to belong to a uniform density region. The region discriminator 54 outputs the determined results to the CPU 55 as region discrimination information.

(3-3) In the above embodiments, filtering with an edge emphasizing filter is performed to emphasize the density of a central pixel. However, edge emphasizing may also be performed by adjusting the densities using a predetermined function.

For this edge emphasizing, the following equation can be used.

$$D'j = Dj * (f(\Delta V) * g(\Delta D))$$

In this equation, j represents the reproduction colors C, M, Y, and K, D'j represents the density value of each reproduction color after the edge emphasizing, and Dj represents the density value of each reproduction color obtained by the color correction unit 59.

Meanwhile, $\Delta D$ is the primary differential value of the density data mentioned in (3-2), and $g(\Delta D)$ represents the edge sharpness indicated by the ordinate axis in FIG. 16.

Figure 17:
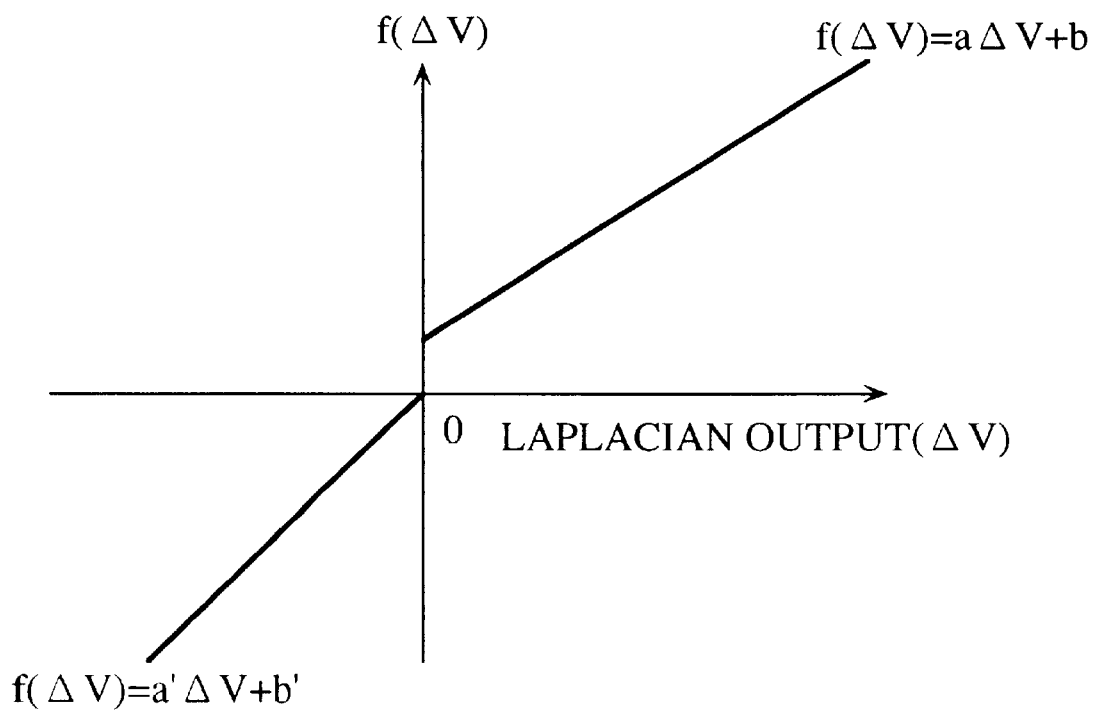
FIG. 17 shows a function f ($\Delta V$) of edge emphasizing.

On the other hand, $\Delta V$ is the Laplacian output of the lightness data used in edge detection by the region discriminator 54 in the above embodiments, and $f(\Delta V)$ is a specific function having the relationship with $\Delta V$ as shown in FIG. 17.

Accordingly, the density correction coefficient is determined by the value of $(f(\Delta V) * g(\Delta D))$, and an edge portion is sharpened in relation with $\Delta V$ and $\Delta D$ by multiplying the density data Dj by the coefficient.

According to this method, edge emphasizing can be performed more effectively than in the case where edge emphasizing is performed using a filter.

(3-4) In the above noise removing unit 56, smoothing is performed using smoothing filters. However, noise removal can be performed more effectively in the following manner.

When smoothing filters are used as described above, weighting addition is performed on the periphery pixels even if noise exists among them. So, the noise may have adverse influence on the reproduction image.

Instead of weighting addtion to all the periphery pixels around the central pixel, some periphery pixels can be extracted if the differences between the values H*, V, and C* of the selected periphery pixel and the values H*, V, and C* of the central pixel are within the allowable ranges dh, dv, and dc. The average value of the density data of the selected pixels is determined and used as the density data of the central pixel in smoothing.

Since a noise pixel usually has an HVC value extremely different from the ordinary pixels, noise pixels can certainly be removed in the above-mentioned manner. Thus, a smoother reproduction image can be obtained without much influence from the noise.

Here, the smoothing condition is determined according to the values of the allowable ranges dh, dv, and dc. If the allowable range values are large, many periphery pixels can be extracted to determine an average value, and the smoothing can be intensified (even if the allowable ranges seem to be a bit too wide, the noise pixels are unlikely to have adverse influence on the smoothing, because the HVC value of a noise pixel is remarkably different from the HVC value of the central pixel).

Noise removal may also be performed in the following manner.

Data within the window of a 5×5 filter are denoted as DT1 to DT25 and rearranged in order of magnitude, and the middle value DT13 is used as the data value of the central pixel when performing noise removal.

Such filter for determining the middle value of the data by arranging them in order of magnitude is generally known as a median filter.

(3-5) Although noise removal is achieved by performing smoothing using filters on the color region signals of H*, V, and C* in the Munsell color space obtained by the HVC converter 53, other methods may be employed for noise removal.

The color region signals converted for noise removal do not necessarily belong to the Munsell color space, but may belong a uniform color space represented by L*a*b* or L*u*v*.

The uniform color spaces of L*a*b* and L*u*v* are the color specification standards set by Commission Internationale de l'Eclairage (CIE). In the uniform color spaces, three stimulus values X, Y, and Z also defined by CIE are transformed into three coordinates in which perceptible color differences can be represented as precisely as possible. The former uniform color space, CIELAB for short, is effective especially when mixing dyestuffs or pigments of different colors. The latter uniform color space, CIELUV for short, is effective when mixing color lights additively, especially when used for color television.

The relation between a color region signal in a uniform color space (L*a*b* or L*u*v*) and the three stimulus values X, Y, and Z is not shown here, as it is well known to those skilled in the art.

(3-6) The present invention is also applicable to image forming apparatus of other types, such as a color facsimile machine.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus which corrects color pixel data before printing of the color pixel data, the apparatus comprising:

an input unit for receiving pixel data on colors constituting an original image having uniform density regions and edge portions;

a first converter for converting said received pixel data into color region signals in a uniform color space;

a discriminator for determining whether said color region signals belong to said edge portions or whether said color region signals belong to said uniform density regions;

a noise removing unit for receiving said color region signals from said first converter and for removing noise from said color region signals which has been determined to belong to said uniform density regions by said discriminator;

a second converter for converting said noise-removed color region signals into pixel data of each color; and an output unit for outputting said pixel data obtained by said second converter wherein said noise removal is executed for improving color print quality of the pixel image data.

2. An image processing apparatus according to claim 1, wherein said pixel data received by said input unit comprises density data of R, G, and B; and said first converter generates color region signals of hue, lightness, and saturation, in accordance with said density data of R, G, and B.

3. An image processing apparatus according to claim 1, wherein said discriminator performs discrimination using a Laplacian filter.

4. An image processing apparatus which corrects color pixel data before printing of the color pixel data, the apparatus comprising:

an input unit for receiving pixel data on colors constituting an original image;

a first converter for converting said received pixel data into color region signals in a uniform color space;

a noise removing unit for performing smoothing by using spatial filter to remove noise from said color region signals obtained by said first converter;

a second converter for converting said noise-removed color region signals into pixel data of each color; and an output unit for outputting said pixel data obtained by said second converter, wherein said noise removal is executed for improving color print quality of the pixel image data.

5. An image processing apparatus according to claim 4, wherein said noise removing unit is provided with a plurality of two-dimensional smoothing filters corresponding to different smoothing conditions, and selects one of said smoothing filters to perform smoothing.

6. An image processing apparatus according to claim 1, wherein said pixel data received by said input unit comprise density data of R, G, and B;

said first discriminator converts said pixel data into color region signals of hue, lightness, and saturation; and said second converter converts said noise-removed color region signals into density data of R, G, and B.

7. An image processing apparatus which corrects color pixel data before printing of the color pixel data the apparatus comprising:

an input unit for receiving pixel data comprising density data of R, G, and B of pixels constituting an original image having uniform density regions and edge portions;

a first converter for converting said received pixel data into color region signals in a uniform color space;

a discriminator for determining whether said color region signals belong to said edge portions or whether said color region signals belong to said uniform density regions;

a noise removing unit for receiving said color region signals from said first converter and for removing noise from said color region signals which has been determined to belong to said uniform density regions by said discriminator;

a second converter for converting said noise-removed color region signals into density data of C, M, and Y; and an output for outputting said density data of C, M, and Y obtained by said second converter;

wherein said noise removal is executed for improving color print quality of the pixel data.

8. An image processing apparatus according to claim 7, wherein said first converter generates color region signals of hue, lightness, and saturation, in accordance with said received pixel data of each color.

9. An image processing apparatus according to claim 8, wherein said second converter is provided with a table for determining said density data of C, M, and Y, according to said color region signals of hue, lightness, and saturation, and converts said noise-removed color region signals into density data of C, M, and Y in accordance with said table.

10. An image processing apparatus which corrects color pixel data before printing of the color image data, the apparatus comprising:

an input unit for receiving pixel data comprising density data of R, G, and B of pixels constituting an original image;

a first converter for converting said received pixel data into color region signals in a uniform color space;

a discriminator for determining, by using primary differential filters, whether said color region signals belong to said edge portions or whether said color region signals belong to said uniform density regions;

a noise removing unit for receiving said color region signals from said first converter and for removing noise from said color region signals which has been determined to belong to said uniform density regions by said discriminator;

a second converter for converting said noise-removed color region signals into density data of C, M, and Y; and an output for outputting said density data of C, M, and Y obtained by said second converter;

wherein said noise removal is executed for improving color print quality of the pixel data.

11. An image processing apparatus according to claim 7, wherein said noise removing unit performs smoothing on color region signals by moving average with weighting addition to the periphery pixels around a central pixel to remove noise from said color region signals.

12. An image processing apparatus according to claim 7, wherein said noise removing unit is provided with a plurality of two-dimensional smoothing filters corresponding to different smoothing conditions, and selects one of said smoothing filters to perform smoothing.

13. An image forming apparatus which corrects color pixel data before image forming operation of the color image data, the apparatus comprising:

an input unit for receiving pixel data on colors of pixels constituting an original image having uniform density regions and edge portions;

a first converter for converting said received pixel data into color region signals;

a discriminator for determining whether said color region signals belong to said edge portions or whether said color region signals belong to said uniform density regions;

a noise removing unit for receiving said color region signals from said first converter and for removing noise from said color region signals which has been determined to belong to said uniform density regions by said discriminator;

a second converter for converting said noise-removed color region signals into pixel data on colors; and an image forming unit for forming an image according to said pixel data obtained by said second converter;

wherein said noise removal is executed for improving quality of the color image formed by said image forming unit.

14. An image processing method for correcting color pixel data before printing of the color pixel data, the method comprising the steps of:

(1) receiving pixel data comprising density data on colors of pixels constituting an original image having uniform density regions and edge portions;

(2) converting said received pixel data into color region signals;

(3) removing noise from said color region signals from said uniform density regions obtained in step (2);

(4) converting said noise-removed color region signals into pixel data of said colors; and (5) outputting said pixel data obtained in step (4);

wherein said step of removing noise further includes the steps of determining whether each pixel data belongs to an edge portion or whether said pixel data belongs to a uniform density region, and removing noise from each pixel data which has been determined to belong to a uniform density region for improving print quality of the pixel data.

15. An image processing method according to claim 14, wherein said step of removing noise further includes the step of performing smoothing with one of two-dimensional smoothing filters corresponding to different smoothing conditions.

16. An image processing method for correcting color pixel data before printing of the color pixel data, the method comprising the steps of:

(1) receiving pixel data comprising density data of R, G, and B of pixels constituting an original image having uniform density regions and edge portions;

(2) converting said received pixel data into color region signals in a uniform color space;

(3) removing color noise from said color region signals from said uniform density regions obtained in step (2);

(4) converting said noise-removed color region signals into density data of C, M, and Y; and (5) outputting said density data of C, M, and Y obtained in step (4);

wherein said step of removing noise further includes the steps of determining whether each pixel data belongs to an edge portion or whether said pixel data belongs to a uniform density region, and removing noise from each color region signal corresponding to pixel data which has been determined to belong to a uniform density region for improving color print quality of the pixel data.

* * * * *